United States Patent [19]

Ham et al.

[11] 3,860,576

[45] Jan. 14, 1975

[54] N-SUBSTITUTED -TETRA-AZACYCLOTETRADECANES

[75] Inventors: George E. Ham, Lake Jackson, Tex.; Don J. Temer, Albuquerque, N. Mex.

[73] Assignee: The Dow Chemical Company, Midland, Mich.

[22] Filed: Apr. 26, 1972

[21] Appl. No.: 247,748

[52] U.S. Cl..... 260/239 BC, 260/2 EP, 260/2.5 AC
[51] Int. Cl............................................ C07d 55/60
[58] Field of Search............................ 260/239 BC

[56] References Cited
OTHER PUBLICATIONS

Curtis, J. Chem. Soc., (London), 1964, pages 2,644–2,650.

Sadasivan et al., J. Am. Chem. Soc., Vol. 88, pages 5,468–5,472 (1966).

Primary Examiner—Joseph A. Narcavage
Attorney, Agent, or Firm—Benjamin G. Colley

[57] ABSTRACT

N-substituted tetraazacyclotetradecanes having one or more substitutents on the nitrogen atoms are provided. They are useful as accelerators for epoxy resins and catalysts for polyurethanes.

4 Claims, No Drawings

N-SUBSTITUED-TETRA-AZACYCLOTETRADECANES

BACKGROUND OF THE INVENTION

This invention relates to new compounds which are tetraazacyclotetradecanes having substituents on one or more of the nitrogen atoms.

The unsubstituted compounds are known from the articles by N. F. Curtis in Coordination Chemistry Reviews, Vol. 3, pages 3–47 (1968); J. Chemical Society, Vol. 1964, page 2644; and Vol. 1967, page 1979.

SUMMARY OF THE INVENTION

The present invention is directed towards N-substituted tetraazacyclotetradecanes which have one of the following formulae:

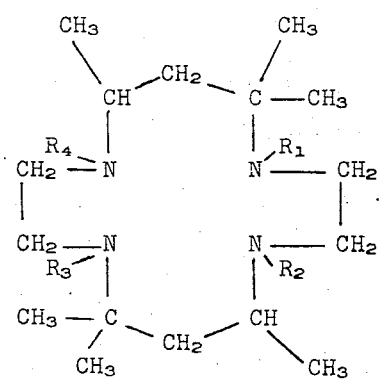

I.

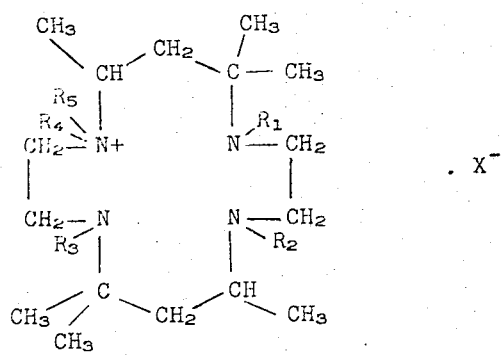

II.

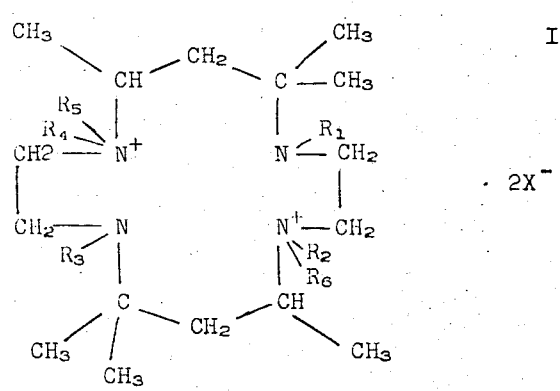

III.

wherein $R_1$-$R_6$ are independently hydrogen, hydrocarbon groups of 1 to 21 carbons or hydrocarbon groups of 1 to 21 carbons with substituents inert to the reaction for their prepartion, X is chlorine, bromine or iodine and wherein no more than three of the R groups are hydrogen.

For example, $R_1$-$R_6$ may be; alkyl groups such as methyl, ethyl, n-propyl, iso-propyl, n-butyl, iso-butyl, n-hexyl, 2-ethylhexyl, n-decyl, n-octadecyl, etc.; hydroxy alkyl groups such as hydroxymethyl, 2-hydroxyethyl, 2-hydroxypropyl, 6-hydroxyhexyl, 4-hydroxybutyl and the like; hydrocarbyloxy-hydroxyalkyl groups such as 3-phenoxy-2-hydroxypropyl, 3-butoxy-2-hydroxypropyl, 3-octadecyloxy-2-hydroxypropyl and the like; alkenyl groups such as allyl, 5-hexene-1yl, 3-butene-1-yl and the like; haloalkenyl groups such as 2-chloroallyl, 3-chloroallyl, 2,3-dichloroallyl, 2-bromoallyl and the like; cyano-alkyl groups such as cyanomethyl, 1-cyanoethyl, 2-cyanoethyl, 4-cyanobutyl and the like; carboalkoxyalkyl groups such as 2-(methoxycarbonyl)ethyl, 2-(stearyloxycarbonyl)-ethyl and the like; aralkyl groups such as benzyl, naphthylmethyl, and the like.

These compounds are prepared by treating 5,7,7,12,14,14-hexamethyl-1,4,8,11-tetraazacyclotetradecane (Formula I; $R_1$-$R_4$ is hydrogen) with alkyl halides, alkylene oxides, activated olefins such as acrylonitrile, methyl acrylate, methyl methacrylate and the like.

The compounds of this invention are useful as accelerators in curing epoxy resins and as catalysts to make polyurethanes.

DETAILED DESCRIPTION

The N-substituted compounds of Formulas I, II, and III are made by reacting ethylene oxide or alkyl halides with the known compound (Formula I; $R_1$-$R_4$ = hydrogen). The final compounds are characterized by having at least one tertiary amine group or at least one quaternary amine group in the molecule.

In the alkoxylation step the starting material is dissolved in an inert organic solvent such as methanol, ethanol, iso-propanol, or benzene. Then, an alkylene oxide such as ethylene oxide, propylene oxide, etc., is sparged into the solution with stirring. The reaction is complete in about 1–4 hours at room temperature. The product is recovered by distillation. The amount of alkylene oxide used can vary from 1 to over 10 moles, depending upon whether or not a mono, di, tri or tetra substituted final product is desired.

In the alkylation step, the starting material is also dissolved in an inert organic solvent such as methanol or benzene and the alkyl halide is added in the desired amount depending upon whether a predominately mono, di, tri or tetra alkylated product is desired. The mixed products can be separated if desired, by fractional distillation or fractional crystallization.

Following the addition of the alkyl halide, about 15 percent excess of a base such as sodium hydroxide, calcium oxide, calcium hydroxide, or sodium carbonate is added within about 2 to about 10 minutes and the mixture is refluxed for a period of about 2 to about 200 hours.

After the refluxing, the solvent is stripped off, the residue is added to distilled water, and the desired product extracted from this solution with a solvent such as ethyl ether, n-hexane, benzene, or toluene. The solvent extracts are dried with an anhydrous salt and distilled to obtain the purified products.

A monoquaternary compound (Formula II) can be obtained by precipitation from the above water solution by allowing it to stand for 12–24 hours at room temperature.

A diquaternary compound (Formula III) can be obtained from the starting compound if about 10 percent excess of alkyl halide is added and if the addition of base takes place in a period from about 10 to about 30 minutes.

Mono- or diquaternary compounds (Formula II and III respectively) can also be made directly from the n-tetrasubstituted tetraazacyclotetradecanes (Formula I) by treating these in methanol or benzene solution with desired amounts of alkyl halide, refluxing for a period of about 2 to about 200 hours and removing the solvent by vacuum distillation.

The following examples are presented solely to illustrate and not limit the invention.

EXAMPLE 1

A reaction flask equipped with Teflon paddle stirrer, thermometer, dry ice-acetone condenser and a glass sparging tube was charged with 10 g. of 5,7,7,12,14,14-hexamethyl-1,4,8,11-tetraazacyclotetradecane (Formula I; $R_1$-$R_4$ = hydrogen) which was dissolved in about 100 mls. of anhydrous methanol. Then 6.9 g. of ethylene oxide was sparged into the reaction vessel over a period of 21 minutes with constant stirring. The temperature increased from 22° to 27°C. during the addition and fell back to 22°C. within an hour after the addition was completed. The reaction was allowed to continue for about 7 days, during which time the temperature remained at 22°C., it was therefore assumed that the reaction had been completed within an hour after the addition of the ethylene oxide had taken place. The product was isolated by stripping off the solvent and any excess ethylene oxide. The yield was 12.36 g. of a white, somewhat gummy solid. The infrared spectrum of the product was consistent for 1,8-dihydroxyethyl-5,7,7,12,14,14-hexamethyl-1,4,8,11-tetraazacyclotetradecane (Formula I; $R_1, R_3 = C_2H_5OH$). An elemental analysis of the product gave the following results: found C = 62.97 percent, H = 11.70 percent, N = 14.51 percent, same sample resubmitted for another analysis, found N = 14.53 percent; calculated (for dihydroxyethyl derivative) C = 64.4 percent, H = 11.81, N = 15.05 percent.

EXAMPLE 2

A reaction flask equipped with a reflux condenser, $N_2$ purge, and thermometer was charged with 20 g. (0.0625 mole) of 5,7,7,12,14,14-hexamethyl-1,4,8,11-tetraazacyclotetradecane dihydrate which was dissolved in about 90 mls. of anhydrous methyl alcohol. Then 41.2 g. (0.29 mole) of methyl iodide (15 percent molar excess) were added followed by the addition of 10 g. of NaOH pellets within five minutes of the addition of the MeI. After refluxing for 93 hours, the solvent and any excess MeI was stripped off. The product consisting of solids and oil was added to distilled water (only the solids dissolved) and then the methylated product was extracted from the mixture with anhydrous ethyl ether. The water solution remaining from the ether extraction was washed with 3–100 ml. portions of ether. The ether extractions were combined and dried over anhydrous sodium sulfate. The sodium sulfate was then filtered off and the oily tetramethylated product was isolated by stripping off the ether. The tetramethylated product (Formula I; $R_1$-$R_4$ = methyl) was further purified by vacuum distillation (boiling point 145°–147°C. at 0.65 mm. of Hg.). An elemental analysis of the product gave the following results: found C = 70.94%, H = 12.51 percent, N = 17.35 percent; calculated C = 70.6 percent, H = 12.94 percent, N = 16.46 percent.

EXAMPLE 3

Upon standing overnight, solids fell out of the water solution of Example 2. The solids were filtered off and vacuum dried (melting point range of 179°–184°C.). The infrared spectrum of the product was consistent for 1,1,4,5,7,7,8,11,12,14,14-undecamethyl-1,4,8,11-tetraazacyclotetradecane iodide hydrate. An elemental analysis of the product gave the following results: found C = 50.11 percent, H = 9.60 percent, N = 11.27 percent, I = 25.56 percent, $H_2O$ = 4.22 percent; calculated (for the mono-hydrate) C = 50.4 percent, H = 9.4 percent, N = 11.2 percent, I = 25.4 percent, $H_2O$ = 3.6 percent.

EXAMPLE 4

If the amount of methyl iodide mentioned in Example 2 was reduced slightly (10 percent excess instead of 15 percent excess) and if the time period between the addition of the sodium hydroxide pellets and MeI was lengthened (from 5 minutes to 20 minutes), then the solids which fell out of the water solution were different than those isolated in Example 3. The solids which were isolated had a melting point range of 180°–185°C. The infrared spectrum was consistent for 1,1,4,5,7,7,8,8,11,12,14,14-dodecamethyl-1,4,8,11-tetraazacyclotetradecane diiodide, hydrate (Formula III; $R_1$-$R_6$ = methyl, X = iodine) and it did not differ greatly from the spectrum from the monoquaternary compound of Example 3. An elemental analysis of the product gave the following results: found C = 40.28 percent, H = 8.19 percent, N = 8.67 percent I = 38.26 percent; (same sample resubmitted for iodine and water analysis) found I = 39.7 percent, $H_2O$ = 4.3 percent; calculated (for dihydrate) C = 40.0 percent, H = 8.18 percent, N = 8.49 percent, I = 38.5 percent, $H_2O$ = 5.45 percent.

EXAMPLE 5

1,4,5,5,7,8,11,12,12,14-Decamethyl-1,4,8,11-Tetraazacyclotetradecane as a Flexible polyurethane Foam Catalyst.

The above named compound of Example 2 (0.125 parts) was mixed with 100 parts of a polyol (a glycerine initiated hetercopolymer of ethylene oxide and propylene oxide having a molecular weight of 3010), 0.5 parts of cell regulator DC-192 (a Dow Corning silicone-polyol copolymer), 4.0 parts water and 0.175 parts of a co-catalyst, stannous octoate. The 'premix' was stirred for 30 seconds. Then toluene diisocyanate (49.6 parts) was added and the mixture stirred for 3–5 seconds. The mixture was then poured into a cardboard cup and the foam allowed to form at room temperature. The 'cream time' was 13 seconds and the 'rise time' was 139 seconds. The foam produced was good quality, free of closed cells and exhibited no cavitation.

EXAMPLE 6

Evaluation of Examples 3 and 4 and Accelerators for Curing Solid Epoxy-Anhydride Resins.

A powdered epoxy resin derived from the diglycidyl ether of bisphenol A and bisphenol A (DER-663) and having an epoxy equivalent weight of 835 (1.0 g.) was mixed well with 0.16 g. of trimellitic anhydride and 0.025 g. of the accelerator given below. The mixture was heated at 175°C. and the gel time noted. Results were:

| Accelerator | Gel Time, Seconds |
| --- | --- |
| None | 96 |
| Product of Example 3 | 73 |
| Product of Example 4 | 83 |

Similar results are obtained for all products of this invention.

EXAMPLE 7

Evaluation of Examples 3 and 4 as Accelerators for Curing Solid Epoxy Resins with Dicyanadiamide.

The solid epoxy resin used in Example 6 (1.0 g.) was mixed well with 0.04 g. of dicyandiamide and 0.02 g. of accelerator and the procedure of Example 6 repeated. Results were:

| Accelerator | Gel Time, Seconds |
| --- | --- |
| None | 800–900 |
| Product of Example 3 | 330 |
| Product of Example 4 | 379 |

We claim:
1. A compound of the formula

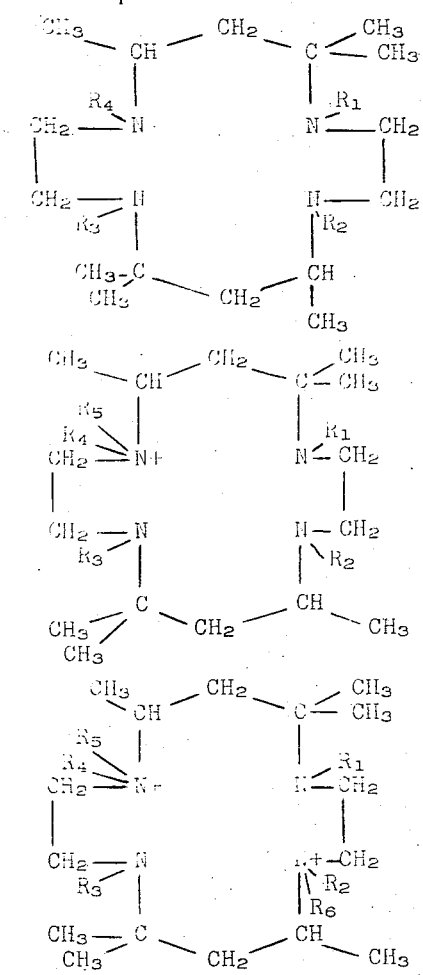

wherein $R_1$-$R_6$ are substituted having 1-21 carbons selected from alkyl groups, hydroxyalkyl groups, hydrocarbyloxy-hydroxyalkyl groups, alkenyl groups, haloalkenyl groups, cyanoalkyl groups, carboalkoxyalkyl groups and aralkyl groups, and X is chlorine, bromine, or iodine.

2. A compound of the formula

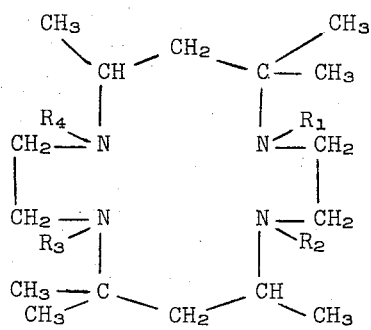

wherein $R_1$-$R_4$ are substituents having 1-21 carbons selected from alkyl groups, hydroxyalkyl groups, hydrocarbyloxy-hydroxyalkyl groups, alkenyl groups, cyanoalkyl groups, carboalkoxyalkyl groups and aralkyl groups.

3. A compound of the formula

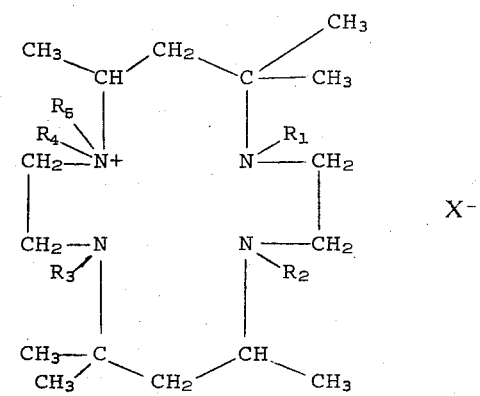

wherein $R_1$-$R_5$ are substituents having 1-21 carbons selected from alkyl groups, hydroxyalkyl groups, hydrocarbyloxyhydroxyalkyl groups, alkenyl groups, cyanoalkyl groups, carboalkoxyalkyl groups and aralkyl groups and X is chlorine, bromine, or iodine.

4. A compound of the formula

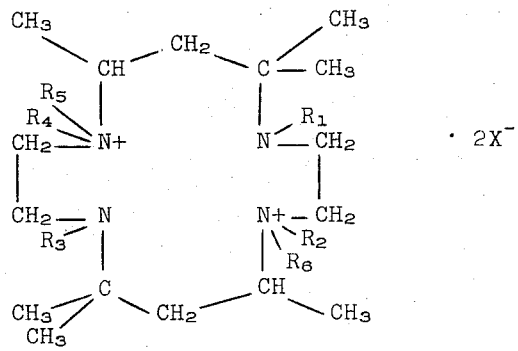

wherein $R_1$-$R_6$ are substituents having 1-21 carbons selected from alkyl groups, hydroxyalkyl groups, hydrocarbyloxy-hydroxyalkyl groups, alkenyl groups, haloalkenyl groups, cyanoalkyl groups, carboalkoxyalkyl groups and aralkyl groups and X is chlorine, bromine, or iodine.

* * * * *